C. H. NESVANT.
SEED DROPPING MECHANISM.
APPLICATION FILED SEPT. 9, 1910.
1,044,905.
Patented Nov. 19, 1912.
2 SHEETS—SHEET 1.
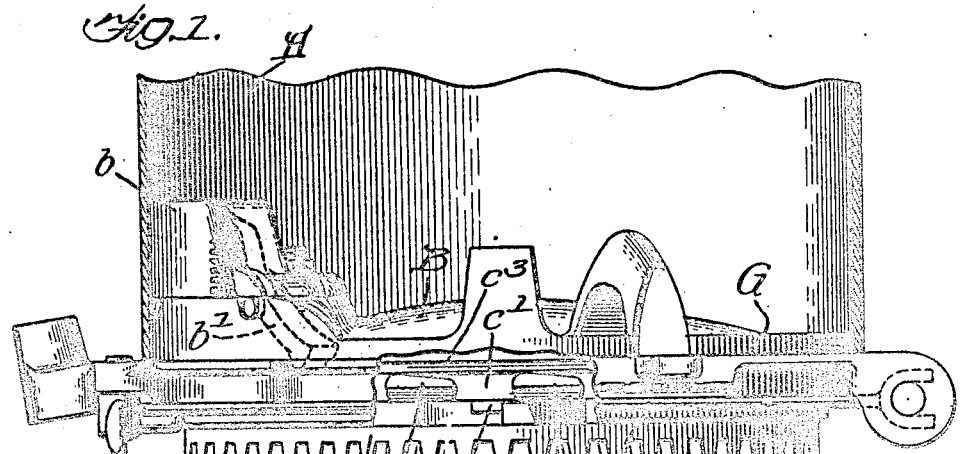
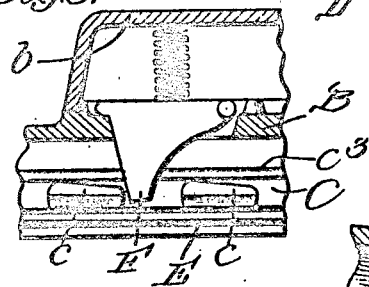
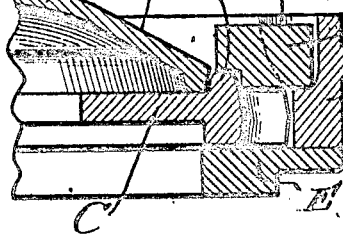
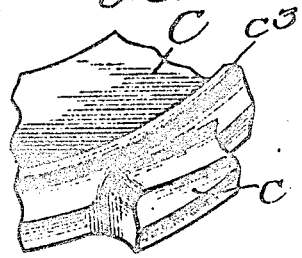
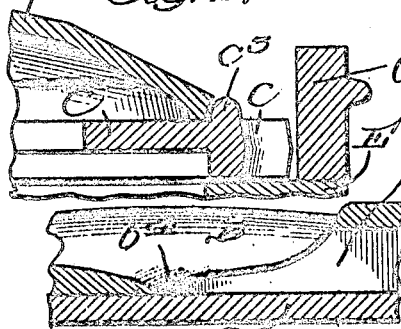

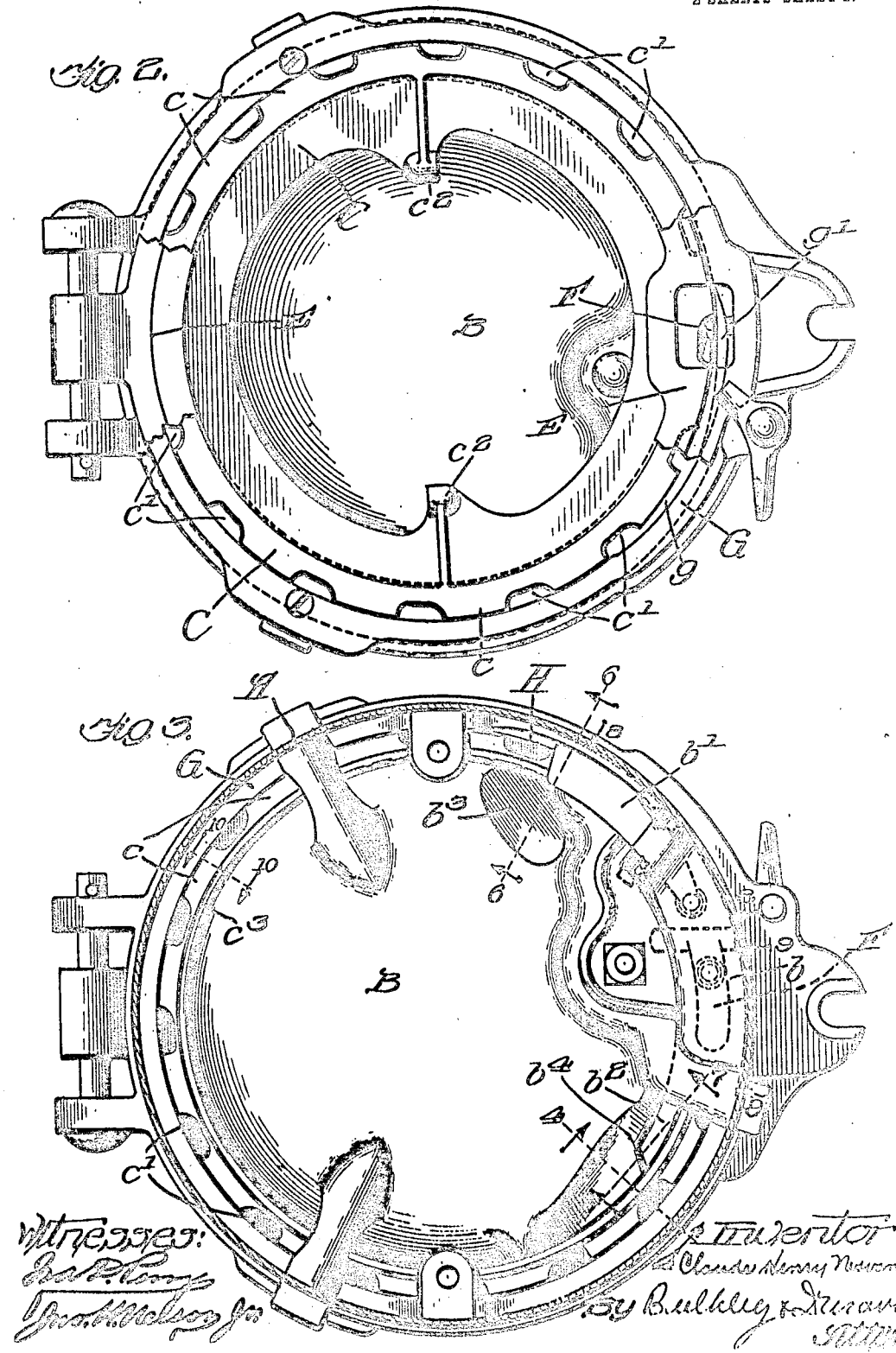

UNITED STATES PATENT OFFICE.

CLAUDE HENRY NESVANT, OF ROCK ISLAND, ILLINOIS, ASSIGNOR TO ROCK ISLAND PLOW COMPANY, OF ROCK ISLAND, ILLINOIS, A CORPORATION OF ILLINOIS.

SEED-DROPPING MECHANISM.

1,044,905.   Specification of Letters Patent.   Patented Nov. 19, 1912.

Application filed September 9, 1910. Serial No. 581,269.

*To all whom it may concern:*

Be it known that I, CLAUDE HENRY NESVANT, a subject of the King of Sweden, and resident of Rock Island, Illinois, United States of America, have invented a certain new and useful Improvement in Seed-Dropping Mechanism, of which the following is a specification.

My invention relates to seed dropping mechanism, and more particularly to the seed dropping mechanism employed for planting corn, such, for example, as that used in the ordinary check-row corn planter.

It relates especially to that construction of rotary seed dropping mechanism in which a so-called seed ring is employed—that is to say, a ring having seed cells or notches therein, whereby the corn is discharged edgewise, a machine of this kind being commonly known as an "edge-drop" planter. The said ring is actuated in a rotary manner, and the kernels of corn are carried by the cells or notches to a point where they are dropped or discharged. The edge-drop is particularly effective in an accumulative drop planter, whereby the number of kernels is predetermined for each hill; although, of course, such mechanism can also be used for drilling. In a particular form of seed dropping mechanism the said cells or notches are formed at the extreme outer edge of the ring, and the mass of corn is supported in the hopper in contact with the ring, so that as the latter revolves a single kernel of corn will settle into each cell or notch in an edgewise manner, and then be carried around to the point of discharge. In a mechanism of this kind the seed or corn does not always settle properly into the cells or notches, as it sometimes happens that the kernels do not enter edgewise, and this interferes with the proper planting of the corn. Also, with the old form of edge-drop mechanism the round kernels had a tendency to collect or accumulate at the bottom of the hopper.

An object of my invention is, therefore, to provide an improved seed ring having means whereby the corn will be agitated or acted upon in such a manner at the bottom of the hopper that each cell or notch in the ring will always be filled, as the result of the rotation of the ring, and whereby the kernels will be more surely and evenly turned edgewise than heretofore, thus insuring a more uniform planting of the corn.

Another object is to provide an arrangement whereby round kernels will pass readily into the cells or notches, at the point of cut off, so that such kernels will not tend to accumulate at the bottom of the hopper.

In the accompanying drawings:—Figure 1 is a side elevation of a rotary seed mechanism embodying the principles of my invention, showing the hopper thereof in vertical section. Fig. 2 is a bottom plan of the mechanism shown in Fig. 1, with the gearing removed, and showing the supporting ring E in dotted lines. Fig. 3 is a top plan of the mechanism shown in Fig. 1. Fig. 4 is an enlarged detail section on line 4—4 of Fig. 3. Fig. 5 is a detail perspective of an edge portion of the seed ring. Fig. 6 is an enlarged detail section on line 6—6 in Fig. 3. Fig. 7 is a similar section on line 7—7 in Fig. 3. Fig. 8 is a detail in section of the cut-off. Fig. 9 is a detail in section of the kick-out. Fig. 10 is a section on line 10—10 in Fig. 3.

As thus illustrated, the seed mechanism comprises the usual hopper A for holding the corn, which hopper has a stationary bottom plate B, which latter is provided at the discharge side of the mechanism with a bulge or raised portion $b$ providing a cavity for the pivoted element or cut-off $b^1$, which latter is shown in dotted lines in Fig. 1. This element or cut-off $b^1$ is for the purpose of keeping the mass of corn from following through to the point of discharge, and operates in the usual and well known manner. The seed ring C is disposed as usual at the bottom of the hopper, and is provided with the usual lugs or teeth $c$, which form seed cells or pockets $c^1$ between them. The ring has inwardly projecting lugs $c^2$ that removably engage the gear wheel D whereby the mechanism is operated. A removable ring E supports the seed ring in the usual manner, and prevents the corn from falling through except at the point of discharge. The construction thus far described is all old and well known.

One feature of novelty consists in the flange or rim $c^3$ which is formed around the periphery of the ring, and which project upwardly any suitable distance, as shown in the drawings. This flange or rim travel around close to and a little below the edge or periphery of the convex bottom plate B, and is spaced from the sides of the hopper by the teeth $c$, whereby the cells or pockets $c^1$ are disposed outside and around the said flange or rim. It will be understood, of course, that with this arrangement the mass of corn or other seed in the hopper rests upon and continually fills the said cells or pockets, except where the latter are covered by the portion $b$, it being below the latter that the discharge takes place in the usual and well known manner. It will also be understood that the said cells or pockets are prevented, by any suitable provision, such as the ring E, from discharging their contents until the point of discharge is reached. At such point the corn is ejected downward from the cells by the kick-out F, which latter is of the ordinary and well known character. The plate B has a by-pass $b^2$, of the usual character, extending around and past the point of discharge, thus exposing a portion of the upper surface of the seed ring immediately inside of the flange or rim $c^3$ thereof. The flat bevel $b^3$ on the plate B is just in front of the cut-off $b^1$ and serves to help prevent jamming or crowding of the corn at this point—that is to say, the surplus corn in front of the cut-off can pass up the incline or bevel $b^3$ on over the plate B, instead of becoming jammed in front of the cut-off. The kernels going through the by-pass come out and pass up the bevel or incline $b^4$ formed on the edge of the plate B at this point. When any corn gets under the cut-off, which is not in the cells, it may then travel under the portion $b$, being carried on the ring at a point inside of the flange or rim $c^3$, and is thus allowed to work back into the body of corn in the hopper. During this time these kernels are prevented by the flange or rim $c^3$ from falling over and being discharged through the usual channel along with the kernels in the cells. Furthermore, the said flange or rim $c^3$ serves to agitate the kernels of corn at the bottom of the hopper and turn the same surely and evenly edge-wise into the cells or pockets $c^1$, as the ring rotates. In this way there is greater certainty than heretofore of each cell or pocket being filled as it moves around, as there is increased agitation of the kernels at the bottom of the hopper, and increased certainty of the kernels being turned edge-wise as they enter the cells, which, of course, is the desired mode of operation of an edge drop. Consequently, a kernel of corn is always dropped from each cell or pocket, having entered edge-wise therein, and the planting is more uniform. By reason of the flange or rim $c^3$ there is, so to speak, a sharp line of demarcation between the corn in and above the cells or pockets and the corn which is on and above the bottom plate B. Furthermore, and as stated, the said flange or rim provides a continuous support for the corn, which produces a more effective agitation of the same, as distinguished from a seed dropping mechanism of this kind in which the teeth $c$ are the only portions of the ring which support the corn. As stated, therefore, each cell or pocket is more certain to fill, and there is greater certainty of only one kernel being discharged from each cell or pocket. Consequently, in check-rowing, which requires a predetermined number of kernels for each hill, there is greater certainty of each hill having the same number of kernels. There is also another trouble which my invention obviates. Prior to my invention, the round kernels tended to accumulate in the bottom of the hopper. This was because the cells could not readily receive the round kernels, and so they tended to collect at the bottom of the hopper. Provision was made, however, for discharging any round kernels that might accidentally become wedged into the cells. I correct this difficulty in the following manner: The rigid or stationary hopper ring G, which encircles the seed ring, has a clearance $g$ on the inner lower edge thereof, which extends from a point about under the beveled end of the cut-off $b^1$ to the point of discharge at $g^1$, as shown in Fig. 2. Thus any round kernels which pass under the cut-off are instantly allowed to settle to the bottom of the cells, and in this way travel around until they fall at $g^1$.

On the upper inside edge of the outside ring G a slight recess H tends to facilitate the passage of the corn under the beveled end of the cut-off $b^1$. Thus, with my improved construction, provision is not only made for releasing the round kernels if they do happen to get into the cells, as was formerly the case, but provision is also made for getting the round kernels properly and easily into the cells. Before my invention, it was an accident when a round kernel got into a cell in an edge-drop planter. Now, and by my invention, it is possible to feed the round kernels into the cells without in any way interfering with the edge-wise introduction of the regular kernels into the cells. By regular kernels I mean the kernels from the middle of the ear of corn. An ordinary edge-drop planter is satisfactory when the corn is selected; but farmers as a class do not do this, but put in everything. Consequently, in an ordinary edge-drop planter, the round kernels from the butts tend to accumulate in the bottom of the hopper. With my invention, however, the round kernels, as explained, can go easily under the cut-off, and then instantly settle into place at the bottom of the cells. In this way the difficulty of using unselected corn in an edge-drop planter is entirely overcome. The clearance g, which grows wider as it approaches the point of discharge, and which is a little wider at bottom than at top, permits the round kernels to pass from the point of cut-off to the point of discharge without grinding or rubbing.

What I claim as my invention is:

1. In a seed dropping mechanism, a rotary seed ring having its periphery provided with cells or pockets, and having an upwardly extending flange or rim extending around immediately inside of said cells or pockets, and having an inclined portion extending into said cells, to turn the kernels edge-wise into the cells, a hopper, and a bottom plate for said hopper, the outer edge of which bottom plate is disposed at the inner edge of said flange or rim.

2. In a seed dropping mechanism, a rotary seed ring having its outer edge formed with teeth or projections, the spaces between said teeth or projections serving as seed cells or pockets, each cell or pocket being open at top and bottom and at the outer side thereof, the said ring being also formed with an upwardly extending flange or rim, to agitate and turn the kernels edge-wise into the cells, which flange or rim extends upwardly from the base of each tooth or projection, a hopper, and a bottom plate for said hopper, the outer edge of which bottom plate is disposed at the inner edge of said flange or rim.

3. In a seed dropping mechanism, a rotary seed ring having its periphery provided with cells or pockets, and having an upwardly extending flange or rim extending around immediately inside of said cells or pockets, a supporting plate for the seed, the edge of said plate being disposed immediately inside of and a little above said flange or rim, and a portion of the edge of said plate being cut away for a distance at the discharge side of the mechanism, to form a by-pass inside of said flange or rim.

4. In a seed dropping mechanism, a rotary seed ring having its outer edge formed with teeth or projections, the spaces between said teeth or projections serving as seed cells or pockets, each cell or pocket being open at top and bottom and at the outer side thereof, the said ring being also formed with an upwardly extending flange or rim, which flange or rim extends upwardly from the base of each tooth or projection, a supporting plate for the seed, the edge of said plate being disposed immediately inside of and a little above said flange or rim, and a portion of the edge of said plate being cut away for a distance at the discharge side of the mechanism, to form a by-pass inside of said flange or rim.

5. In an edge-drop planter, a rotary seed ring provided with cells in the outer edge thereof, a cut-off, a kick-out, and an outer stationary ring, said stationary ring having a clearance extending from the cut-off to the kick-out, whereby round kernels enter the cells and pass easily from the cut-off to the kick-out.

6. In a seed dropping mechanism, a rotary seed ring having its outer edge provided with teeth or projections, spaces between said teeth or projections serving as seed cells or pockets, each cell or pocket being open at top and bottom and at the outer side thereof, the said ring being also formed with an upwardly extending flange or rim, which flange extends upwardly from the face of each tooth or projection, said projections having their outward faces inclined downwardly and the leading edge being higher than the following edge.

7. In a seed dropping mechanism, a hopper, a rotary seed ring located in the bottom of said hopper, said ring provided with cells at its outer edge, a cut-off for removing surplus grain from the cells, and a flange or rim on the outer edge of said seed ring and inside of said cells, whereby surplus kernels which pass under said cut-out are prevented from being discharged and are allowed to work back into the body of corn in the hopper.

Signed by me at Rock Island, Illinois, this 6th day of Sept., 1910.

CLAUDE HENRY NESVANT.

Witnesses:
J. M. F. LARDNER,
C. E. SHARPE.